(12) United States Patent
Newman et al.

(10) Patent No.: US 6,859,144 B2
(45) Date of Patent: Feb. 22, 2005

(54) VEHICLE SITUATION ALERT SYSTEM WITH EYE GAZE CONTROLLED ALERT SIGNAL GENERATION

(75) Inventors: Timothy J. Newman, Noblesville, IN (US); Gregory K. Scharenbroch, Kokomo, IN (US); Matthew R. Smith, Westfield, IN (US); Harry Zhang, Carmel, IN (US); Glenn R Widmann, West Bloomfield, MI (US); Gerald J. Witt, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/358,978

(22) Filed: Feb. 5, 2003

(65) Prior Publication Data

US 2004/0150514 A1 Aug. 5, 2004

(51) Int. Cl.[7] .............................. G08G 1/16; G06K 9/00
(52) U.S. Cl. ...................... 340/576; 340/903; 340/436; 382/103; 382/104; 701/301
(58) Field of Search ................................. 340/576, 903, 340/436, 435, 439; 382/103; 701/301

(56) References Cited

U.S. PATENT DOCUMENTS

| | | | |
|---|---|---|---|
| 4,397,531 A | 8/1983 | Lees ........................... | 351/210 |
| 4,648,052 A | 3/1987 | Friedman et al. ............ | 364/550 |
| 4,720,189 A | 1/1988 | Heynen et al. .............. | 351/210 |
| 4,836,670 A | 6/1989 | Hutchinson ................. | 351/210 |
| 4,950,069 A | 8/1990 | Hutchinson ................. | 351/210 |
| 5,521,580 A * | 5/1996 | Kaneko et al. ............. | 340/439 |
| 5,583,590 A | 12/1996 | Clupper ...................... | 351/200 |
| 5,680,118 A | 10/1997 | Cusumano et al. ......... | 340/903 |
| 5,729,619 A * | 3/1998 | Puma ........................... | 382/115 |
| 5,867,587 A | 2/1999 | Aboutalib et al. .......... | 382/117 |
| 5,907,293 A | 5/1999 | Tognazzini .................. | 340/903 |
| 5,956,181 A | 9/1999 | Lin ............................. | 359/630 |
| 6,114,951 A * | 9/2000 | Kinoshita et al. ........... | 340/436 |
| 6,150,932 A | 11/2000 | Kenue | |
| 6,154,123 A | 11/2000 | Kleinberg ................... | 340/436 |
| 6,154,559 A * | 11/2000 | Beardsley ................... | 382/103 |
| 6,200,139 B1 | 3/2001 | Clapper ....................... | 434/62 |
| 6,346,887 B1 | 2/2002 | Van Orden et al. ......... | 340/575 |
| 6,393,361 B1 * | 5/2002 | Yano et al. .................. | 701/301 |
| 6,397,137 B1 | 5/2002 | Alpert et al. ................ | 701/49 |
| 6,424,273 B1 * | 7/2002 | Gutta et al. ................. | 340/903 |
| 6,474,683 B1 | 11/2002 | Breed et al. ................. | 280/735 |
| 6,496,117 B2 * | 12/2002 | Gutta et al. ................. | 340/576 |
| 6,642,840 B2 * | 11/2003 | Lang et al. .................. | 340/435 |
| 2003/0039378 A1 * | 2/2003 | Yuasa et al. ................. | 382/104 |
| 2004/0178890 A1 * | 9/2004 | Williams et al. ............ | 340/425.5 |

* cited by examiner

*Primary Examiner*—Jeffery Hofsass
*Assistant Examiner*—Anne Lai
(74) *Attorney, Agent, or Firm*—Stefan V. Chmielewski (57) ABSTRACT

A system responds to detection of a vehicle situation by comparing a sensed eye gaze direction of the vehicle operator with data stored in memory. The stored data defines a first predetermined vehicle operator eye gaze direction indicating a high probability of operator desire that an alert signal be given and a second predetermined vehicle operator eye gaze direction indicating a low probability of operator desire that an alert signal be given. On the basis of the comparison, a first or second alert action is selected and an alert apparatus controlled accordingly. For example, the alternative alert actions may include (1) generating an alert signal versus not generating the alert signal, (2) generating an alert signal in a first manner versus generating an alert signal in a second manner, or (3) selecting a first value versus selecting a second value for a parameter in a mathematical control algorithm to determine when or whether to generate an alert signal.

10 Claims, 9 Drawing Sheets

VEHICLE SITUATION ALERT SYSTEM WITH EYE GAZE CONTROLLED ALERT SIGNAL GENERATION

TECHNICAL FIELD

The technical field of this invention is vehicle situation alert systems.

BACKGROUND OF THE INVENTION

Vehicle operators routinely encounter vehicle situations in which a decision is required or advisable to take action, either by performing a vehicle control action or by refraining from performing an intended vehicle control action, in order to avoid an undesirable event; but a vehicle operator may not become aware of such a situation in time for the optimal action.

For example, an operator of a first vehicle may be driving in a lane of a multi-lane roadway when a second, faster moving vehicle in an adjacent lane approaches from the rear. This does not by itself require any action by the first vehicle operator, as long as the operator is not planning to change lanes into the lane occupied by the overtaking second vehicle. But if the operator of the first vehicle is intending to change lanes into that occupied by the overtaking second vehicle, a collision might occur when that action is taken. The operator of the first vehicle, before changing lanes, may check a rear view mirror to determine if any vehicles are present in the destination lane. But most vehicles have a "blind spot," in which another vehicle cannot be easily seen with such a mirror check. Thus, it has been suggested to provide a detector, based on radar or a similar technology, to detect a second vehicle in the adjacent lane and alert apparatus responsive to such detection to provide an alert to the operator of the first vehicle of the presence of a second vehicle. An operator may consider such a detector useful as a backup to his own driving procedures. But most of time the operator of the first vehicle has no intention of changing lanes; and for such times the operator may consider the repeated activation of the alert signal may to be useless and annoying.

Another example of such a vehicle situation is a person, animal, second vehicle or other object that appears on the road in the projected path of the first vehicle. An alert operator of the first vehicle will normally see the potential for collision with the object and brake and/or steer to avoid it; but an operator of the first vehicle who is distracted might be looking away from the road ahead and miss the chance to avoid collision. An external object detector directed toward the projected path of the vehicle may activate an alert device to bring the attention of the first vehicle operator back in time to avoid the collision. But, once again, alert signals generated by the presence of preceding vehicles may be similarly annoying when the vehicle operator of the following vehicle is looking ahead and already aware of them.

SUMMARY OF THE INVENTION

This invention responds to detection of a vehicle situation by comparing a sensed eye gaze direction of an operator of a first vehicle with data stored in memory. The stored data defines a first predetermined vehicle operator eye gaze direction indicating a high probability of operator desire that an alert signal be given and a second predetermined vehicle operator eye gaze direction indicating a low probability of operator desire that an alert signal be given. On the basis of the comparison, one of a first alert action and a second alert action is selected; and an alert apparatus is controlled accordingly. For example, the alternative alert actions may include at least: (1) generating an alert signal versus not generating the alert signal, (2) generating an alert signal in a first manner versus generating an alert signal in a second manner, or (3) selecting a first value versus selecting a second value for a variable in a mathematical control algorithm to determine when or whether to generate an alert signal.

In a specific example, for a first vehicle in a driving lane and a second vehicle overtaking in an adjacent lane, a detected vehicle situation may be an external object in a detection area to the side of the vehicle including the adjacent lane; and an alert may be generated in response to detection of an eye gaze direction toward a rear view mirror on the same side of the vehicle as the adjacent lane, since this direction may be considered indicative of an operator intention to change lanes. In this example, the alert would not be given or would be given in a different manner in response to detection of an eye gaze direction toward the front of the vehicle, since this direction indicates a much lower likelihood of an operator intention to change lanes.

In another specific example, the detected vehicle situation may be an object, such as a second vehicle, person or obstruction directly ahead in the projected path of the first vehicle: and an alert may be generated in response to an eye gaze direction other than straight ahead, since the operator may not be otherwise aware of the detected object. In this example, the alert would not be given, or would be given in a different manner, if the detected eye gaze direction is straight ahead, since the operator is likely to see the object even without the alert.

In yet another specific example, the vehicle may be equipped with an additional system to alert an operator that he is closer than a specified range of a leading vehicle based on a mathematical algorithm processing measured dynamic parameters of the vehicles. The additional system may determine the specified range including an added value to account for driver and/or system reaction time prior to vehicle brake actuation. In this example, the added value may be determined at least partly in response to the detected operator eye gaze direction, since the latter may indicate how quickly the operator will respond to the situation.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
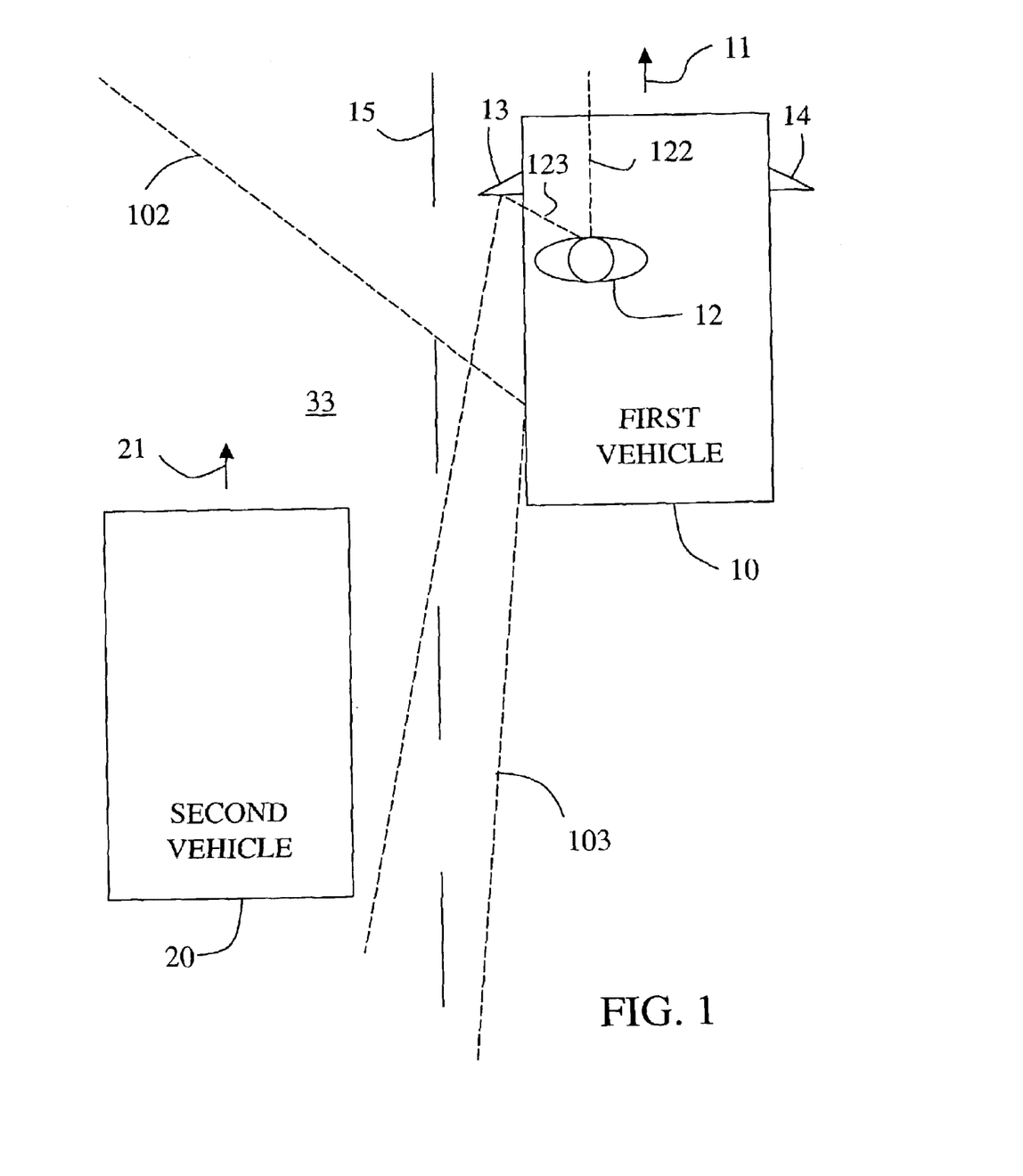
FIG. 1 is an overhead view of vehicles in two adjacent lanes on a highway proceeding in the same direction with the second vehicle overtaking the first vehicle on the left.

FIG. 1 shows a first vehicle 10 having a preferred embodiment of the apparatus of this invention and proceeding forward in the right hand one of two adjacent lanes separated by lane markers 15. First vehicle 10 is proceeding upward on the page, as indicated by arrow 11. An operator 12 is sitting on the driver side (the left side in this embodiment) of vehicle 10. Vehicle 10 is provided with an external, driver side rear view mirror 13 and may also be provided with an external, passenger side rear view mirror 14 (the passenger side is the side of the vehicle opposite the driver side).

A second vehicle 20 is somewhat behind the first vehicle 10 in the adjacent left hand lane and proceeding in the same direction, as indicated by arrow 21. Vehicle 20 has a high probability of being visible to operator 12 of vehicle 10 in the mirror 13 if his eye gaze direction is to the mirror, as indicated by dashed line 123; but it will not be visible to him if his eye gaze direction is directly to the front, as indicated by dashed line 122.

Figure 3:
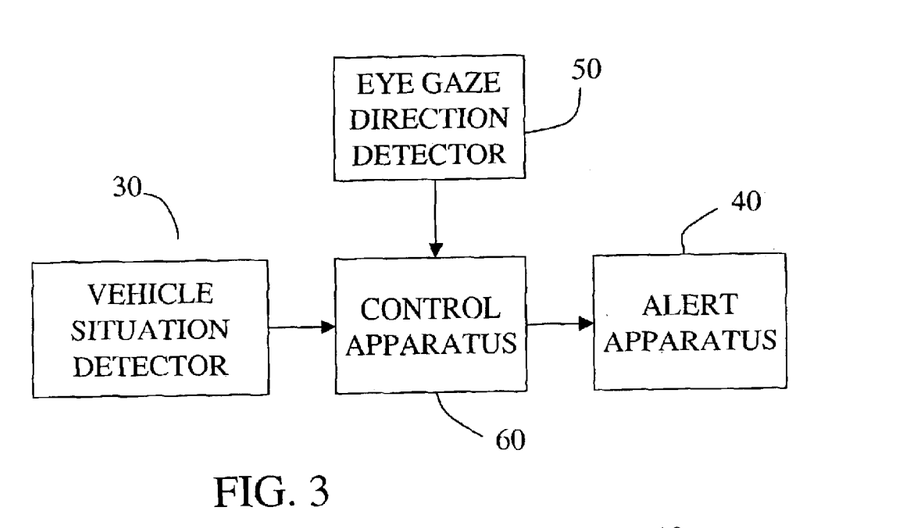
FIG. 3 is a block diagram of apparatus embodying the invention.

Vehicle 10 is provided with an external object detector 30 directed to detect objects in the adjacent lane such as vehicle 20 and is further provided with an alert signal generating apparatus 40 capable of responding to the detection of such an object by generating an alert signal, which could be audible, visible, tactile or presented in any other useful and effective manner. One preferred example of such an alert signal is a visible display, using any useful display technology, in mirror 13 itself or in any other convenient and effective place within or on vehicle 10 as chosen by the system designer. Without the apparatus of this invention, such an alert signal would be generated each and every time a vehicle such as vehicle 20 is located within the detection area of detector 30: in heavy traffic, the alert could be almost continuous. If the alert is visible in a forward located area, such as a heads up display projected on the vehicle windshield or on the instrument panel or dashboard, or if the alert is audible, it is likely to become annoying and distracting to the vehicle operator and/or other occupants under such conditions. The only time the vehicle operator actually needs the alert is when a determination is made to maneuver vehicle 10 into the adjacent lane. The apparatus of this invention is thus provided with a vehicle operator eye gaze direction detection apparatus 50, which detects such a lane change intention by detecting a first predetermined eye gaze direction of the vehicle operator directed at mirror 13, as indicated by dashed line and provides a signal of this first predetermined eye gaze direction to a control apparatus 60. Eye gaze direction detection apparatus 50 may be any such apparatus capable of optically or otherwise detecting the direction of the eye gaze of the vehicle operator, examples of which are shown and described in the prior art. A control 60 is provided to receive the output signals from external object detector 30 and operator eye gaze direction detector 50 as inputs, determine whether or not to activate alert signal generator 40 and provide the activating signal when an affirmative decision is reached.

Figure 4:
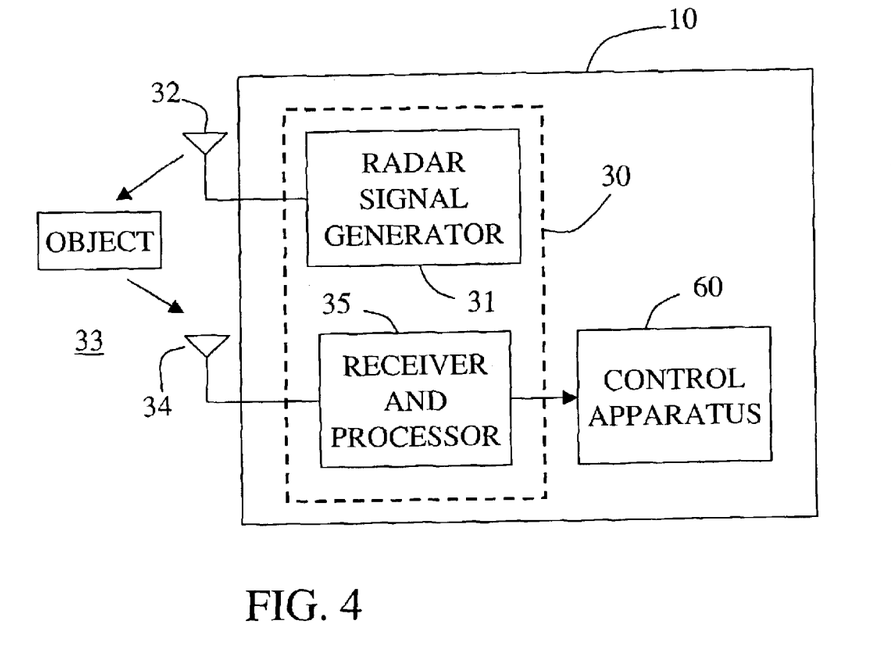
FIG. 4 is a block diagram an external object detector for use as the detector of a vehicle situation in the apparatus of FIG. 3.

In more detail, the external object detector 30 may be, for example, a radar device as shown in FIG. 4. A radar signal generator 31 provides repeated pulse signals to a transmitting antenna 32, which directs the signals into a detection area 33 external to and adjacent vehicle 10: for example, an area between dashed lines 102 and 103 that is not in the present path of vehicle 10. Any of the signals encountering an object, such as another vehicle, in the detection area are at least partially reflected, with the reflected portion received by a receiving antenna 34. The received signals are provided to a receiver and processor 35, which processes the signals in a known manner to reveal the presence of the object in the detection area and possibly characterize the objector its motion in a known manner. A signal indicating the detection of the object (in some cases, if it has a predetermined characterization) is then output to control apparatus 60.

Figure 5:
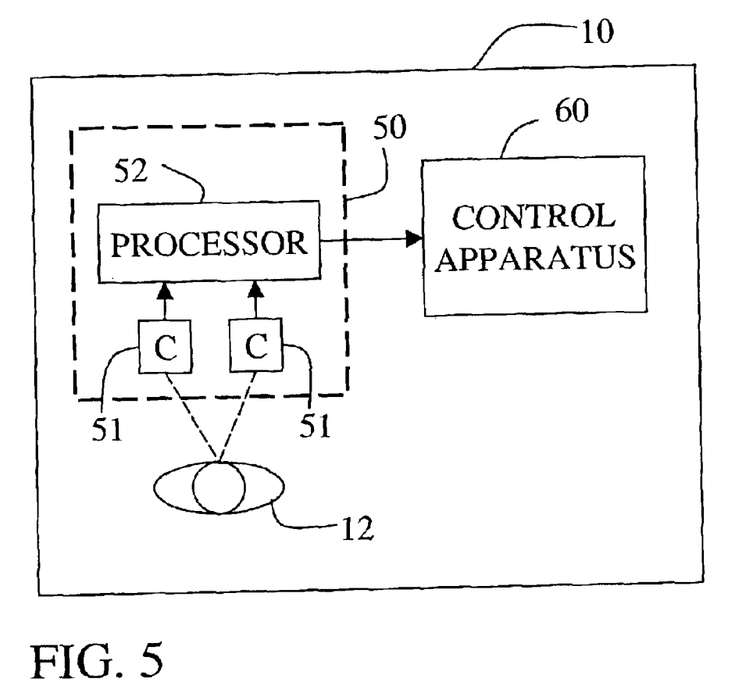
FIG. 5 is a block diagram of an eye gaze direction detector used in the apparatus of FIG. 3.

The eye gaze direction detector 50 may be, for example, a device as shown in FIG. 5. A processor 52 receives signals from a stereo pair of cameras 51. The cameras are mounted in the front of the passenger compartment of vehicle 10 and directed back at the front of the vehicle operator so as to see the operator's eyes. The visual signals received by cameras 51 are converted to electronic form and provided to the processor, which constructs a model of the operator's face to locate the eyes and then analyzes the eye images to determine the eye gaze direction. A signal of the eye gaze direction is then provided to control apparatus 60. The apparatus may further analyze the facial model to determine a head direction, to supplement and/or substitute for the eye gaze direction; and the signal provided may include this head direction information.

Figure 6:
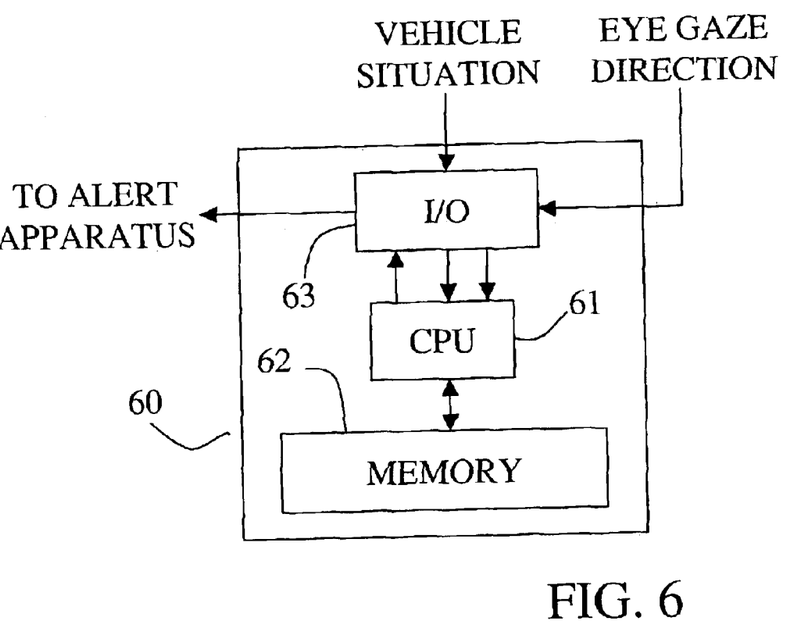
FIG. 6 is a block diagram of a control apparatus for use in the apparatus of FIG. 3.

Control 60 may be based on a digital computer, shown in FIG. 6, which includes a CPU 61, memory 62 preferably including volatile (RAM) and non-volatile (ROM) memory, input/output (I/O) apparatus 63 and any other necessary circuitry and/or apparatus, not shown, such as communication links with other vehicle systems. The control operates as directed by a program stored in the non-volatile memory, as described for example with reference to the flow chart of FIG. 7. Routine ALERT 1 begins at step 70 by reading the inputs: namely, the external object detection signal and the eye gaze direction signal, as well as any other inputs deemed advantageous by the system designer. At step 72, the routine determines if an external object has been detected. If none is detected, the routine returns for the next scheduled loop. If there has been such a detection, the routine proceeds to determine at step 74 if a usable eye gaze direction has been detected. If not, the routine defaults by proceeding to step 78 wherein it generates a signal to activate an alert signal in apparatus 40 and then returns for the next loop. But if a usable eye gaze direction exists, the routine proceeds at step 76 to compare data in the signal describing its direction with data stored in memory 62 defining a first eye gaze direction and an alternative second eye gaze direction. If the data in the signal matches that of the first eye gaze direction, the routine proceeds to step 78 wherein it selects a first alert action of apparatus 40, which in this embodiment is to activate a predetermined alert signal. But if the data in the signal matches that of the second eye gaze direction, the routine proceeds to step 79 and selects a second alert action of apparatus 40, which in this embodiment is to not provide the predetermined alert signal. The routine then returns for the next loop.

In the embodiment of FIG. 1, the data in memory 62 defining the first and second eye gaze directions are calibrated to provide a first alert action of generating a predetermined alert signal when the vehicle operator is looking in a direction that indicates a high probability of an intention to change lanes, such as toward driver side rear view mirror 13, but to provide a second alert action of not generating the predetermined alert signal when the vehicle operator is looking in a direction that indicates a low probability of an intention to change lanes, such as directly forward. Thus, the first eye gaze direction is toward mirror 13, as indicated by dashed line 123 in FIG. 1; and the second eye gaze direction is straight ahead, as indicated by dashed line 122 in FIG. 1. Thus, the system allows generation of the predetermined alert signal to supplement the operator's mirror check and create awareness of the presence of vehicle 12 even if the operator misses it in the mirror but does allow generation of the predetermined alert signal at times when the operator shows no indication of an intention to change lanes and would consider such an alert a nuisance.

Figure 7:
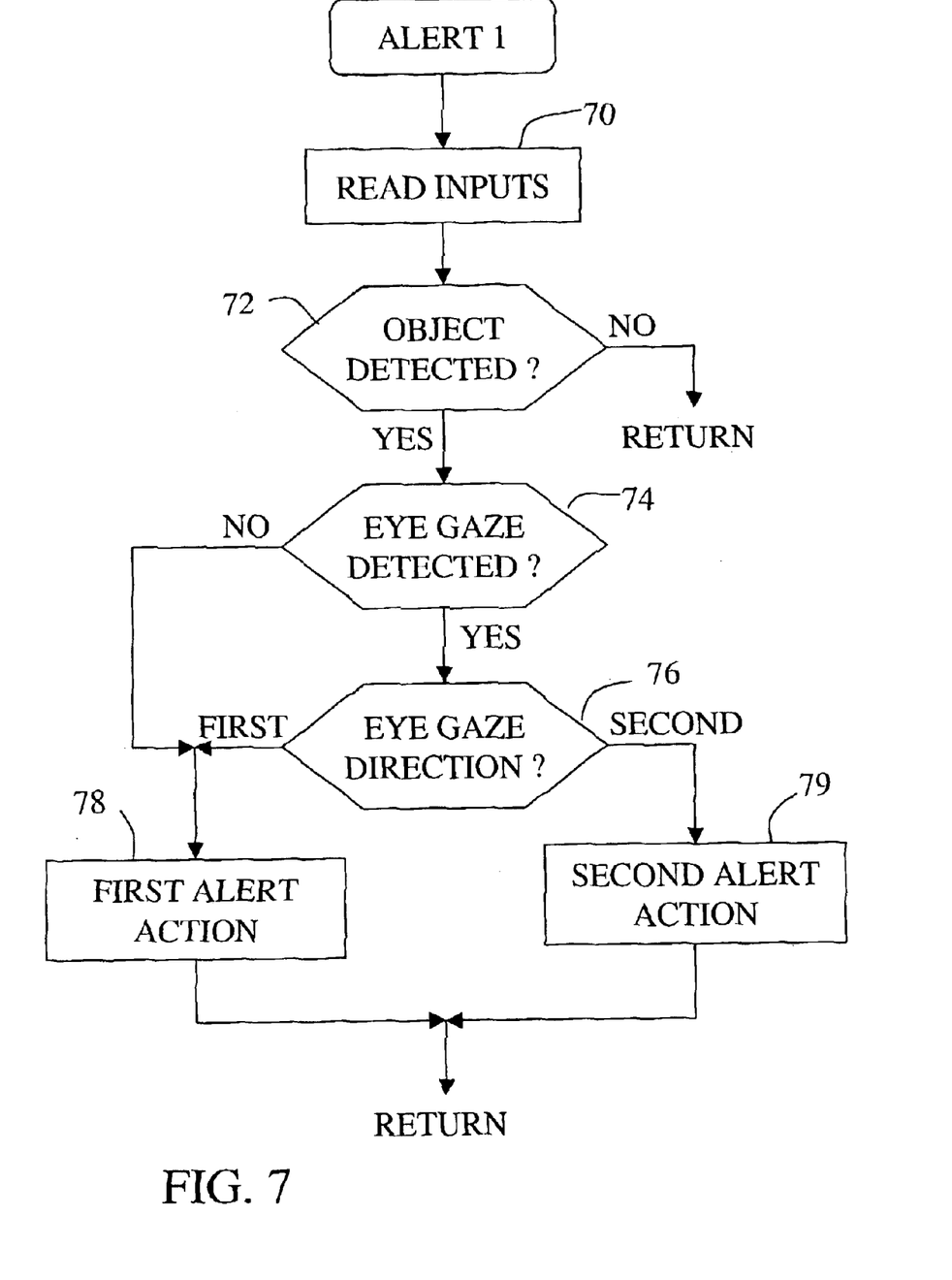
FIG. 7 shows a flow chart illustrating the operation of an embodiment of the invention.

In practice, the flow chart may be modified or additionally interpreted depending on the designer's assumptions and common sense. For example, only two specific eye gaze directions—straight ahead or at mirror 13—are described above; but other eye gaze directions exist. One or more of these other eye gaze directions might be included as alternatives with either of the first and second eye gaze directions; and/or a default "other" category may result in a predetermined one of the selections for eye gaze directions other than the first and second. For example, an eye gaze direction to the left further back than the mirror would indicate a high probability of an intended lane change to the left; and the first eye gaze direction could be defined as either of (1) toward mirror 13 or (b) to the left further back than mirror 13. As another example, the second eye gaze direction could be defined as any direction other than the first eye gaze direction (becoming a default by definition). Similar practical variations will occur to designers in the art.

A variation of the process described in the preceding paragraph is available if the eye gaze direction determining process includes or is supplemented, as previously described, by a determination of an operator head direction, wherein the head direction is the direction faced by the front of the operator's head. Especially with vehicle side mirrors, a driver will often turn the head at least partly in the direction of the mirror to observe the mirror (and will have to turn the head to attempt to directly see the vehicle "blind spot" on the left side. To the extent that a head direction is determined and is deemed sufficiently reliable to indicate a probable eye gaze direction, the phrase "eye gaze direction" as used in this application may be broadly interpreted to include the head direction, either as a supplement or, perhaps in certain circumstances or in a limited manner, as a substitute, except where the language clearly specifies a distinction. For example, if an object is detected at step 74 but an eye direction per se cannot be determined in the normal manner, it may yet be possible to determine a head direction for the operator. If this head direction is considered a sufficiently reliable indicator of eye gaze direction, the flow chart may yet proceed to step 76 using the head direction as an indication of eye gaze direction. Furthermore, different data may be stored in memory for applying to the decision made at step 76, depending on whether it is the eye gaze direction itself or the head direction as an indication of eye gaze direction that is being used.

Figure 2:
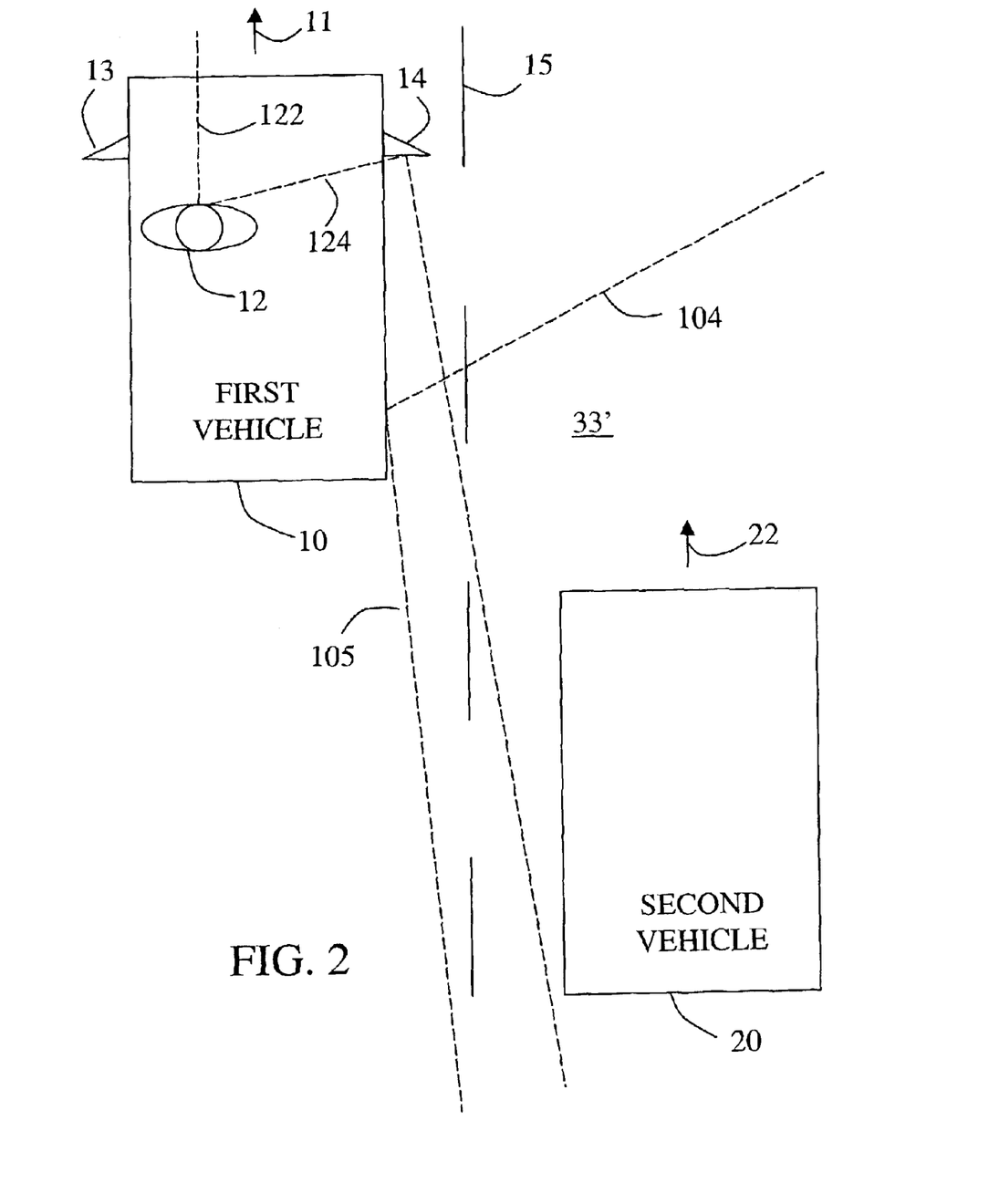
FIG. 2 is an overhead view of vehicles in two adjacent lanes on a highway proceeding in the same direction with the second vehicle overtaking the first vehicle on the right.

Another embodiment of the invention is shown in FIG. 2. This embodiment is similar to that of FIG. 1 except that vehicle 20 is in the adjacent lane on the passenger side of vehicle 10. The basic apparatus and operation are the same as that of the embodiment of FIG. 1, except that the detection area 33' is on the passenger side of vehicle 10 between the dashed lines 104 and 105, and it is the passenger side mirror 14 must be consulted to indicate an operator intention to change lanes. Thus, the first eye gaze direction in this embodiment is toward passenger side rear view mirror 14, as indicated by dashed line 124 in FIG. 2. The second eye gaze direction, as in the first embodiment, is straight ahead as indicated by dashed line 122. In addition, the embodiment of FIG. 2 may be provided on a vehicle that also includes the embodiment of FIG. 1, so that the first alert action of apparatus 40 to generate a predetermined alert signal will be selected for vehicle 20 detected on either side of the vehicle provided that operator 12 of vehicle 10 has an eye gaze directed at the mirror on the same side of the vehicle; but the second alert action of apparatus 40 to not generate the predetermined alert signal will be selected for a vehicle 20 on either side as long as operator 12 of vehicle 10 is looking straight ahead.

Figure 8:
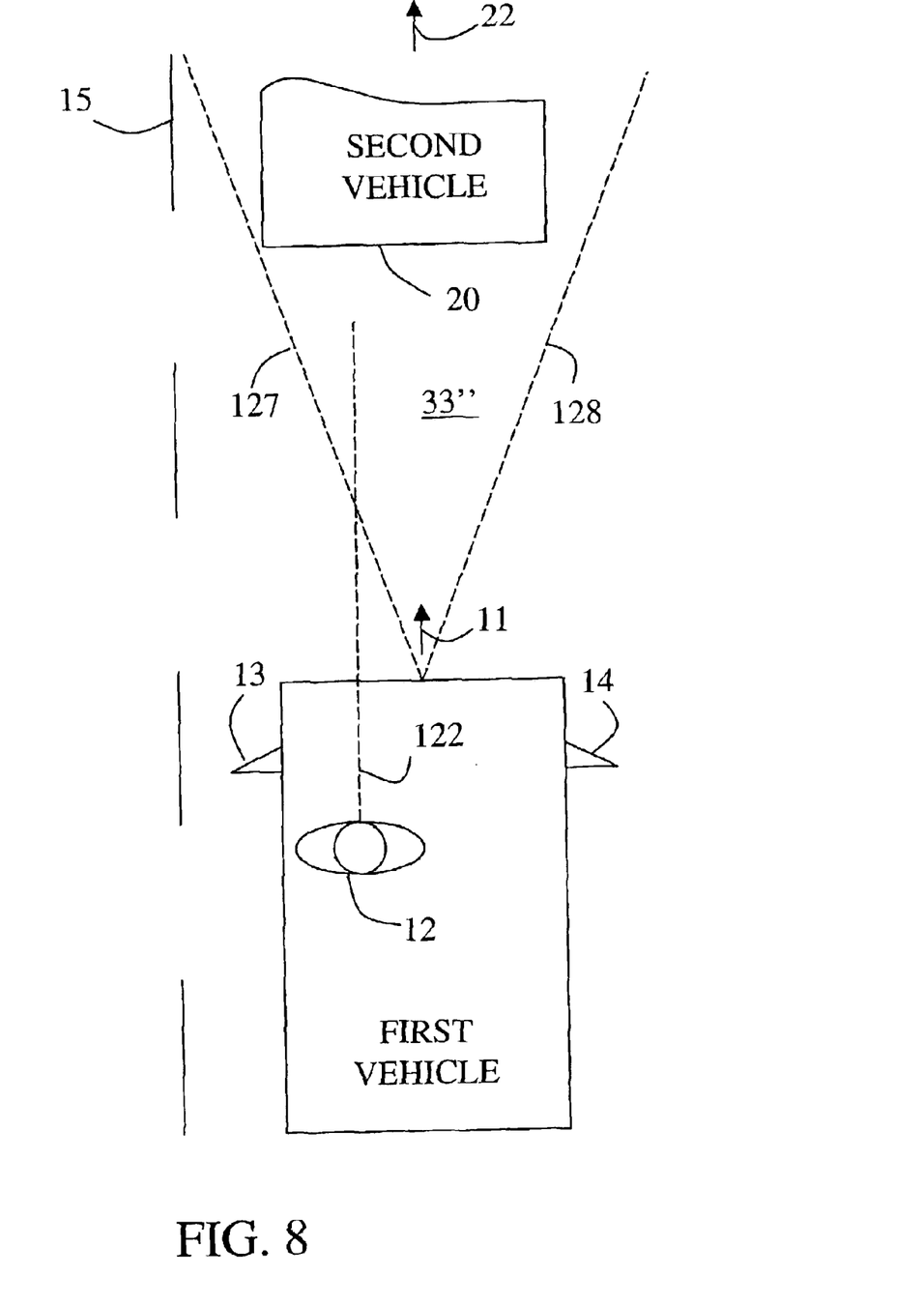
FIG. 8 is an overhead view of a first vehicle in a lane overtaking a second vehicle in the same lane.
Figure 9:
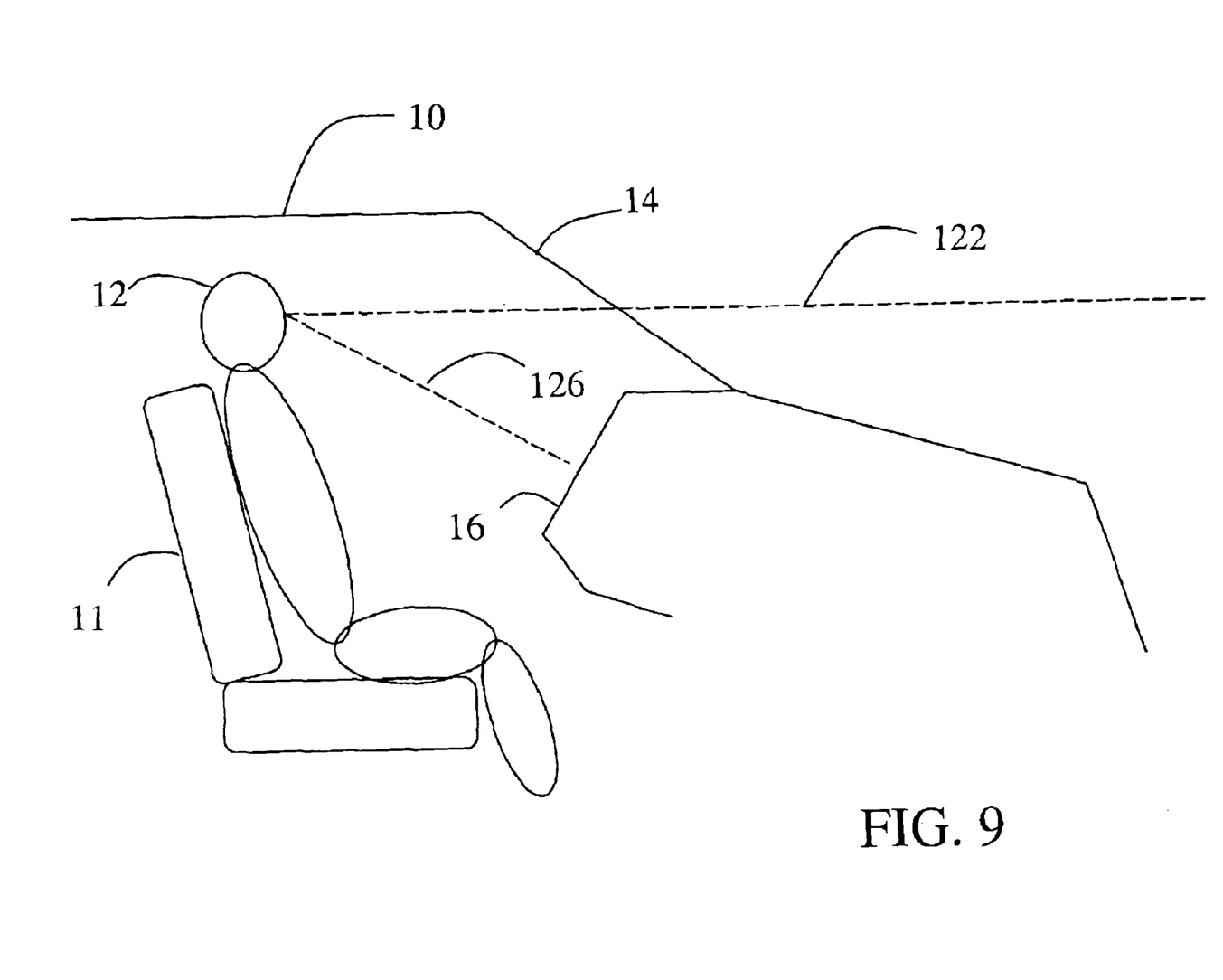
FIG. 9 is a side view of a vehicle operator in the driver seat of the first vehicle shown in FIG. 8.

An additional embodiment of the invention is shown in FIGS. 8 and 9. In this embodiment, the external object detector is directed forward into the projected path of the vehicle, with a detection area 33" between the dashed lines 127 and 128, so that it will detect an object, such as another vehicle, a pedestrian or other object, that presents a vehicle situation about which the vehicle operator may wish to be alerted, in that there is a significant probability of collision. FIG. 8 shows first vehicle 10 driving in a lane in the direction of arrow 11 to the rear of and overtaking second vehicle 20 driving in the same lane at a slower speed. An operator 12 in the driver seat 11 of vehicle 10 looking straight ahead through windshield 14, with an eye gaze direction along dashed line 122, has no need of an alert. Vehicle 20 is plainly visible; and driver 12 may take whatever evasive action is necessary, for example slowing down or changing lanes, to avoid a collision. In such a case, an alert signal would most probably be considered a nuisance at best. But a driver 12 looking in a direction other than straight ahead may indeed be unaware of the vehicle situation ahead of vehicle 10. For example, an operator 12 looking downward at instrument panel 16 as seen in FIG. 9, with an eye gaze direction along dashed line 126, may not be aware of vehicle 20 or may not be truly aware of a speed difference between them; and an-alert signal of the presence of an object such as vehicle 20 in the projected vehicle path would be useful. Thus, the apparatus of FIG. 3–7 may be used to determine whether a predetermined alert signal will be given. In this embodiment, the second predetermined eye gaze direction is straight ahead through windshield 14, as indicated by dashed line 122; and the first predetermined eye gaze direction is any direction other than straight ahead: for example, looking downward at the instrument panel 16, as indicated by dashed line 126, toward either of side mirrors 13 and 14, or even eyes closed. The apparatus of this invention will thus, in this embodiment, select a first alert action to generate a predetermined alert signal if vehicle 20 is detected ahead of and in the projected path of vehicle 10 and driver 12 of vehicle 10 is exhibiting an eye gaze direction other than straight ahead through windshield 14 and will select a second alert action to suppress the predetermined alert signal when the object is detected but driver 12 is looking straight ahead through windshield 14.

In the examples described above, a predetermined alert signal is activated or not activated depending on detected eye gaze direction at the time of detection of a vehicle situation. The systems described may have only a single predetermined alert signal, so that when it is activated it is the only signal given and when it is not activated no signal is given. Alternatively, the systems may have a plurality of possible alert signals, of which the predetermined alert signal is only one; or the alert signal may be capable of being generated in alternative, different manners. If this is the case, the failure to generate a predetermined one of the alert signals, or to generate it in a predetermined manner, does not preclude the generation of the alert signal in a different manner or the generation of a different alert signal. For example, sophisticated systems may provide a plurality of possible signals that are graded in their capacity for commanding attention, wherein the least aggressive alert signals are used in cautionary situations and more aggressive alert signals are reserved for imminent situations approaching and/or reaching emergency status. In addition, the selection of signals may be further affected by other factors such as perceived object characteristics (size, speed, location, etc.), different vehicle parameters (speed, acceleration, steer angle, etc.), sensed operator condition, etc. The alternative actions of the alert signal generating apparatus controlled in response to eye gaze direction at the time of detection of a vehicle situation include at least (1) generating an alert signal versus not generating an alert signal (examples provided above), (2) generating a first alert signal versus generating a second, different alert signal (example: a visual signal versus an audible signal), (3) generating an alert signal in a first manner versus generating the alert signal in a second, different manner (example: generating a soft audible signal versus generating a loud audible signal). The alert signals may differ in medium (visual, audible, etc.), content (specific text, sounds, volume, size, color, brightness, etc.), display location, timing, etc.

Another embodiment of the invention shows the integration of detected eye gaze direction into a more complex process in which the final generation of an alert signal is additionally dependent on other factors, at least one of which is at least partly dependent on the eye gaze direction. This embodiment is a variation on that shown in FIG. 8, but in the specific context of a following distance alert system, in which an alert signal is generated when the first, following vehicle 10 gets too close to a second, lead vehicle 20. Such systems are known and use measured dynamic vehicle parameters to calculate an alert range or distance from the lead vehicle 20, for example, within which vehicle 10 could not stop to avoid a collision if vehicle 20 were to decelerate to a stop. The calculated alert range includes a portion (distance) corresponding to the distance travelled by vehicle 10 at its present vehicle speed during the operator and system reaction time: that is, the time required for the operator and system to recognize the need to stop and initiate the braking process.

Figure 10A:
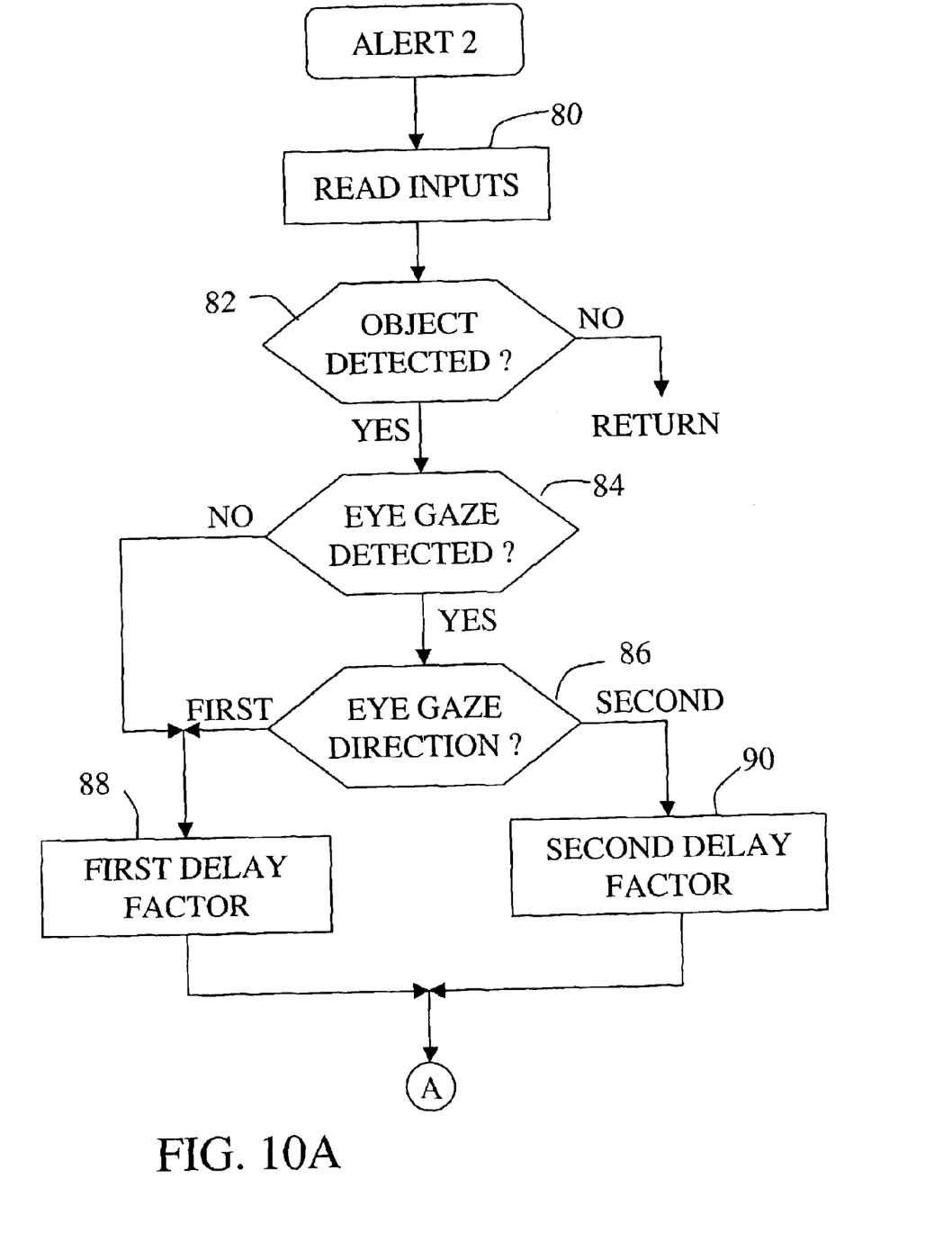
FIGS. 10A and 10B show a flow chart illustrating the operation of another embodiment of the invention.
Figure 10B:
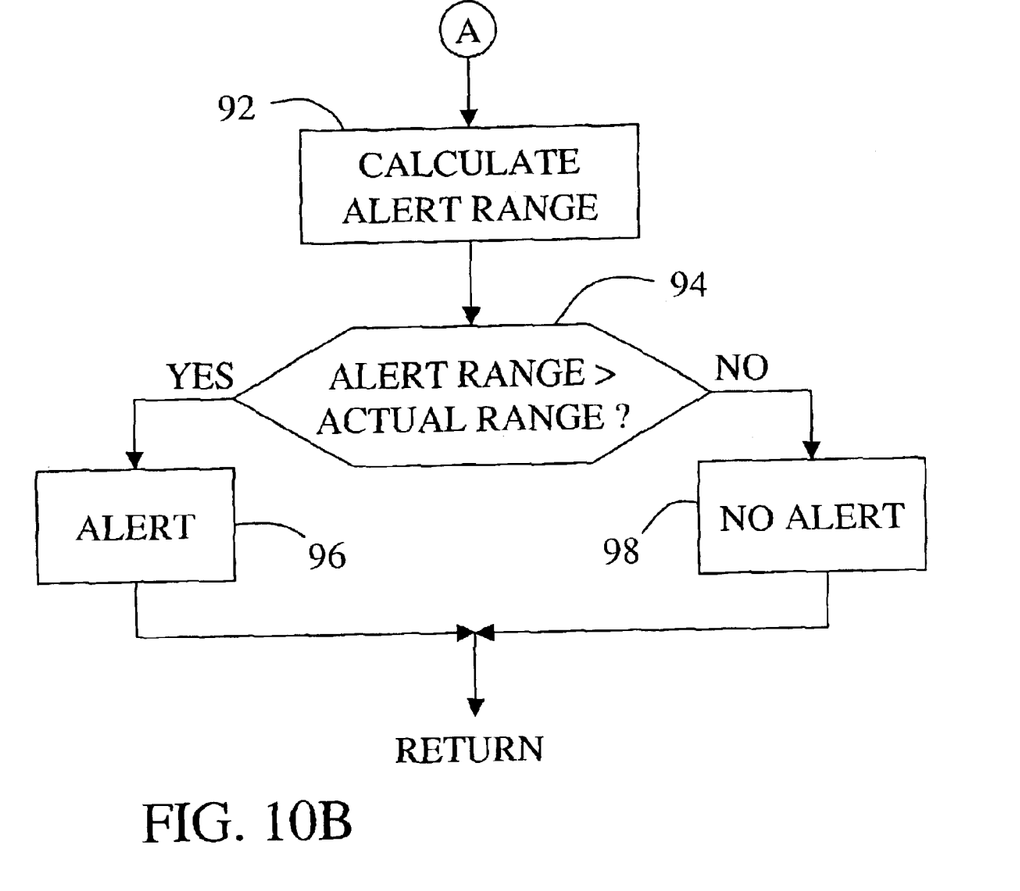

This embodiment is described with reference to the flow chart of FIGS. 10A and 10B. Routine ALERT 2 begins at step 80 by reading inputs: the external object detection signal and the eye gaze direction signal as in ALERT 1 of FIG. 7, but also additional dynamic information from object detector 30, such as the range (distance) and range rate (relative speed) of the leading vehicle 20. It also reads the vehicle speed of vehicle 10 itself. ALERT 2 continues in parallel with routine ALERT 1 by determining at step 82 if a leading vehicle or similar object has been detected by reading the required inputs, determining at step 84 if an eye gaze direction has been detected and comparing a detected eye gaze direction to stored data at step 86 to determine if it is the first eye direction or the second eye direction. This process is essentially the same as that previously described until one of the first and second alert actions. The selection is made in the same manner, in step 88 or step 90 depending on the results at steps 84 and/or 86; but the first and second alert actions themselves are first and second delay factors to be used in a mathematical algorithm used to calculate an alert distance.

The alert range is calculated at step 92, reached from either of steps 88 or 90 and is basically the sum of two distances: (1) the distance required for vehicle 10 to stop without colliding with leading vehicle 20 with the brakes applied (braking distance $D_B$) and (2) the distance covered by vehicle 10 at its present speed during the operator/apparatus reaction time before the brakes can be fully applied (delay distance $D_D$). The first of these distances is discussed in the prior art and may be computed in any known algorithm chosen by a system designer, one example being that described in U.S. Pat. No. 5,680,118, issued Oct. 21, 1997. The second of these distances is equal to a total delay time $T_D$ times the vehicle speed $S_V$: $D_D = T_D * S_V$. The total delay time $T_D$ may be the sum of a predetermined standard delay $T_0$ and a situation specific variable $T_S$ determined from the vehicle and/or driver situation: $T_D = T_0 + T_S$. It is the latter, specific variable $T_S$ that is affected by driver attention/distraction and thus may be optimised in response to detected operator eye gaze direction. The detected eye gaze direction may thus be used to help determine the estimated operator/mechanism delay time $T_D$ for use in this calculation, as part of the specific value $T_S$. For example, if the operator is looking directly ahead and thus should be aware at least of the presence of the vehicle, the estimated reaction time may be considered shorter, and the value of $T_S$ thus smaller, than if the operator is looking in another direction and is more likely to be unaware of the closeness of the vehicle being followed. Referring to FIG. 10A, the first delay factor of step 88 and the second delay factor of step 90 are different values of the specific time delay $T_S$; and the selected one of these values is used for $T_S$ in step 92, FIG. 10B. Thus the process begun by the selection of a delay time $T_S$ at step 88 or step 90 continues at step 92 with an addition of delay time $T_0$ to form total delay $T_D$, the multiplication of total delay $T_D$ by vehicle speed $S_V$ to determine the delay distance $D_D$ and the addition of the separately calculated braking distance $D_B$ to obtain the alert range.

The routine then proceeds to step 94, in which the alert range is compared to the actual range or detected distance to vehicle 20. If the alert range exceeds the actual range, an alert signal is generated at step 96; if not the alert signal is not generated, as indicated at step 98 (although a different signal could be generated, as previously described). It should be noted that, for purposes of the comparison, the total delay time TD could be equivalently used to determine the detected range (by subtraction from the measured value) rather than being used to determine the alert range (by addition).

Variations of this embodiment may use time or another dynamic parameter rather than distance or range in the mathematical calculations and comparison of a detected value of the parameter and an alert value of the parameter; but they will all have in common that an operator reaction time will affect the desired alert value of the parameter and that the detected eye gaze direction may be used as a significant input in determining the operator reaction time contribution to one or the other of the detected value and the alert value of the parameter. For example, the parameter may be time, with the detected value derived from a simple calculation based on a detected distance between the vehicles divided by the detected relative velocity of the vehicles, to be compared with a programmed or calculated alert time to determine when an alert signal is to be generated. One of the two values will include an additional operator reaction time, either added to the alert time or subtracted from the detected time, as is convenient. According to this invention, the value of the alert time may be determined in accordance with a detected eye gaze direction as described above.

What is claimed is:

1. A vehicle situation alert system comprising:
    an external object detector directed to an area to one side of the vehicle for detection of an external object adjacent a projected path of the vehicle;
    a vehicle operator eye gaze direction detector;
    memory apparatus storing data defining a first vehicle operator eye gaze direction toward a vehicle mounted mirror providing a view of at least a portion of the area to one side of the vehicle and a second vehicle operator eye gaze direction to the front of the vehicle;
    an alert apparatus; and
    a control apparatus responsive to the external object detector, the vehicle operator eye gaze direction detector and the memory apparatus to select generation of an alert signal of an external object in the area in response to detection of an external object in the area and the first vehicle operator eye gaze direction and alternatively to select no generation of the alert signal of an external object in the area in response to detection of an external object in the area and the second vehicle operator eye gaze direction, the control apparatus being thereafter effective to control the alert apparatus in accordance with the selection.

2. A vehicle situation alert system according to claim 1 wherein the one side of the vehicle is the driver side of the vehicle and the vehicle mounted mirror is disposed on the driver side of the vehicle.

3. A vehicle situation alert system according to claim 2 wherein the alert apparatus comprises a display in the vehicle mounted mirror.

4. The vehicle situation alert system of claim 1 wherein the one side of the vehicle is the passenger side of the vehicle and the vehicle mounted mirror is disposed the passenger side of the vehicle.

5. A vehicle situation alert system according to claim 4 wherein the alert apparatus comprises a display in the vehicle mounted mirror.

6. A vehicle situation alert system comprising:
    an external object detector effective to detect a predetermined vehicle situation in an area to one side of the vehicle;
    a vehicle operator eye gaze direction detector;
    memory apparatus storing data defining a first vehicle operator eye gaze direction indicating a high probability of operator desire for alert of the predetermined vehicle situation and a second vehicle operator eye gaze direction indicating a low probability of operator desire for alert of the predetermined vehicle situation;
    an alert apparatus;
    a control apparatus responsive to the external object detector, the vehicle operator eye gaze direction detector and the memory apparatus to select generation of an alert of the predetermined vehicle situation in a first manner in response to detection of the predetermined vehicle situation and the first vehicle operator eye gaze direction and alternatively to select generation of an alert of the predetermined vehicle situation in a second manner different from the first manner in response to detection of the predetermined vehicle situation and the second vehicle operator eye gaze direction, the control apparatus being thereafter effective to control the alert apparatus in accordance with the selected one of the first alert action and the second alert action; and
    wherein, the first operator eye gaze direction is toward a vehicle mounted mirror providing a view of at least a portion of said area to one side of the vehicle and the second operator eye gaze direction is toward the front of the vehicle.

7. A vehicle situation alert system according to claim 6 wherein the one side of the vehicle is the driver side of the vehicle and the vehicle mounted mirror is disposed on the driver side of the vehicle.

8. A vehicle situation alert system according to claim 7 wherein the alert apparatus comprises a display in the vehicle mounted mirror.

9. The vehicle situation alert system of claim 6 wherein the one side of the vehicle is the passenger side of the vehicle and the vehicle mounted mirror is disposed on the passenger side of the vehicle.

10. A vehicle situation alert system according to claim 9 wherein the alert apparatus comprises a display in the vehicle mounted mirror.

* * * * *